J. NORDLUND.
FISHING TACKLE.
APPLICATION FILED OCT. 3, 1911.
1,023,028.
Patented Apr. 9, 1912.
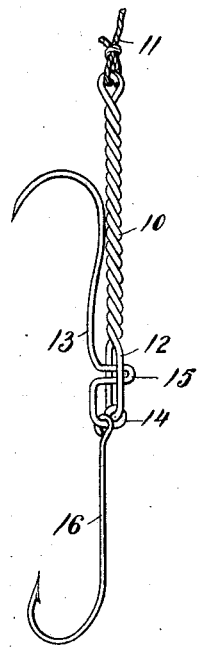
Fig. 1.
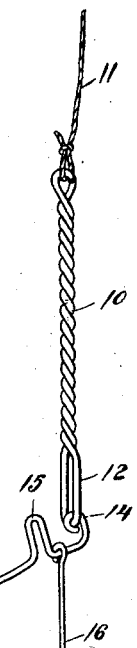
Fig. 2.
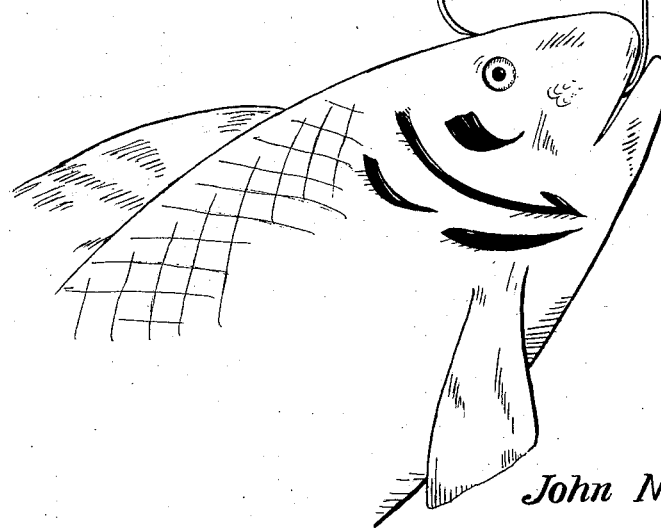
Inventor
John Nordlund.
Witnesses:
Carroll Bailey.
By Victor J. Evans
Attorney

UNITED STATES PATENT OFFICE.

JOHN NORDLUND, OF EUREKA, CALIFORNIA.

FISHING-TACKLE.

1,023,028.    Specification of Letters Patent.    Patented Apr. 9, 1912.

Application filed October 3, 1911. Serial No. 652,511.

*To all whom it may concern:*

Be it known that I, JOHN NORDLUND, a citizen of the United States, residing at Eureka, in the county of Humboldt and State of California, have invented new and useful Improvements in Fishing-Tackle, of which the following is a specification.

An object of the invention is to provide a fishing tackle for more securely retaining a fish on the hook thereof.

My invention embodies among other features, a device provided with the usual hook, which when swallowed by the fish causes a securing member to move into engagement with the fish and retain the fish on the hook.

For the purpose mentioned, use is made of a shank for connection with a line at one end thereof and provided at the other end with a loop, a retaining member mounted on the loop of the said shank and provided with an offset portion adapted to be received within the said loop, the said retaining member having the outer end thereof curved and a hook mounted to swing between the said offset portion and the point of attachment of the said retaining member to the said shank, the pull of the fish after the same has engulfed the hook being adapted to cause the retaining member to move toward the hook and engage the fish to retain the same on the hook.

Reference is to be had to the accompanying drawings constituting a part of this specification, in which similar characters of reference denote corresponding parts in all the views, and in which—

Figure 1 is a perspective view of my device, showing the same in initial position. Fig. 2 is a perspective view of my device, showing the same in final position to retain a fish in engagement with the hook.

Referring more particularly to the views, I provide a shank 10, preferably formed of an integral piece of wire with the upper end of the said shank adapted to receive an end of a fishing line 11 and the lower end of the same formed into an elongated loop 12.

A retaining member 13, formed of an integral piece of wire having one end thereof bent to form an eye 14 for pivotal connection with the loop 12, is provided with an integral offset portion 15, formed by bending the wire in one direction and then bending the same on itself, the free or outer end of the wire being curved as shown in Fig. 1 and the offset portion 15 being adapted to be received within the loop 12 for a purpose that will be more fully disclosed hereinafter. Pivotally connected to the retaining member 13, between the eye 14 and the offset portion 15 is a hook 16, the said hook being of any preferable shape and similar to the type of hook now generally used in fishing.

In the use of my device, the retaining member 13 is moved to the position shown in Fig. 1, with the offset portion 15 extending through the loop 12. Now when a fish swallows the hook 16, the said fish pulling on the hook will cause the retaining member 13 to move toward the hook so that the free end of the retaining member will engage the head of the fish and prevent the fish from becoming disengaged from the hook, as shown in Fig. 2, it being understood that the offset portion 15 frictionally engaging the sides of the loop 12 acts to normally retain the retaining member in initial position.

I claim:—

1. A device of the class described comprising a shank, formed of an integral piece of material and having the lower end thereof formed into a loop, a retaining member mounted to swing on the said loop and provided with an integral offset portion adapted to be frictionally received within the said loop, the free end of the said retaining member being curved and a hook mounted to swing on the retaining member between the point of attachment of the retaining member to the said shank and the said offset portion.

2. A device of the class described comprising a shank provided with an integral loop at one end thereof, a retaining member mounted to swing on the said shank and provided with an offset portion adapted to partially extend through the said loop and a hook mounted to swing on the said retaining member.

In testimony whereof I affix my signature in presence of two witnesses.

JOHN NORDLUND.

Witnesses:
H. M. MAUNDER,
ERNST JOHNSON.

Copies of this patent may be obtained for five cents each, by addressing the "Commissioner of Patents, Washington, D. C."